US006150629A

United States Patent [19]

Sievers

[11] Patent Number: 6,150,629

[45] Date of Patent: Nov. 21, 2000

[54] LASER ENGRAVING SYSTEM

[75] Inventor: Wolfgang Sievers, Kremperheide, Germany

[73] Assignee: Baasel-Scheel Lasergraphics GmbH, Itzehoe, Germany

[21] Appl. No.: 08/875,352

[22] PCT Filed: Nov. 28, 1996

[86] PCT No.: PCT/EP96/05277

§ 371 Date: Sep. 29, 1997

§ 102(e) Date: Sep. 29, 1997

[87] PCT Pub. No.: WO97/19783

PCT Pub. Date: Jun. 5, 1997

[30] Foreign Application Priority Data

Nov. 29, 1995 [DE] Germany .......................... 195 44 502

[51] Int. Cl.[7] .................................................. B23K 26/00

[52] U.S. Cl. .............................. 219/121.62; 219/121.68; 219/121.76

[58] Field of Search ......................... 219/121.61, 121.62, 219/121.68, 121.69, 121.74, 121.76, 121.77; 358/297; 264/400

[56] References Cited

U.S. PATENT DOCUMENTS 4,131,782 12/1978 Einstein et al. .................... 219/121.69
4,839,497 6/1989 Sankar et al. .................. 219/121.76 X
4,947,023 8/1990 Minamida et al. ................ 219/121.68
4,959,275 9/1990 Iguchi et al. .................. 219/121.69 X
5,379,059 1/1995 Winsor .................................. 346/108
5,391,856 2/1995 Minamida et al. ................ 219/121.68
5,427,026 6/1995 Kuwahara ...................... 219/121.68 X

FOREIGN PATENT DOCUMENTS 3714504 11/1988 Germany .
4212390 10/1993 Germany .
63-299883 12/1988 Japan ............................... 219/121.77
93/25387 12/1993 WIPO .

*Primary Examiner*—Samuel M. Heinrich
*Attorney, Agent, or Firm*—Bacon & Thomas. Inc.

[57] ABSTRACT

A laser engraving machine (4) is used for engraving a workpiece surface (22) by a modulated laser beam in order to form a desired profile in the workpiece surface. The fine structures of the profile are formed by the laser beam of a first laser which is modulated by an acoustooptic modulator (12) with relatively high modulation frequency, while the deep areas of the desired profile are formed by the laser beam of a second laser (10), for which purpose the modulator (12), on the one hand, and the second laser beam source (10), on the other hand, are driven by interrelated but separate control signals (S3, S2). The two perpendicular polarized laser beams from the modulator (12) and the second laser beam source (10) are transmitted and reflected by a selective mirror (14), respectively, and applied commonly via an optical system (18) to the workpiece surface (22) to be machined.

6 Claims, 4 Drawing Sheets

8
S1
1. Laser
PC
6
IF
12
S3
4
AOM
S2
16
14
2. Laser
10
18
22
2

(A) Profile of 2
X
22
$T_G$
$T_M$
(B) S1 max
0
(C) S3 max
0
(D) S2 max
0
t1
t2
t3
t4
t5
t6
t

LASER ENGRAVING SYSTEM

BACKGROUND OF THE INVENTION

1. Field of the Invention

This invention relates to a laser engraving machine for engraving a workpiece surface, having a first laser beam source, a modulator in the beam path of the first laser beam source, an optical system following the modulator and spaced from the workpiece surface, the optical system and the workpiece being moved relative to each other, a control device driving the modulator with a first control signal so that its output radiation impinging on the workpiece surface is modulated according to the first control signal and machines the workpiece surface accordingly deeply, and a second laser beam source which is driven by the control device with a second control signal.

2. Description of the Related Art

Such laser engraving machines are known. The laser beam source characteristically consists of a $CO_2$ laser which is driven by the control device with a control signal which depends on the desired machining profile of the workpiece surface. The workpiece surface is moved relative to the optical system. The workpiece is characteristically a cylinder made of rubber or plastic for example, which is clamped in a laser engraving machine where it is rotated and simultaneously moved translationally parallel to its rotation axis so that the laser beam focused on the workpiece surface by the optical system scans the workpiece surface and removes the workpiece surface more or less deeply in accordance with the control signal by corresponding beam intensity.

FIG. 1 shows a laser engraving machine which partly corresponds to the prior art.

Workpiece 2 is a cylinder made of rubber or having rubber surface 22. Workpiece 2 is rotated and moved translationally in the direction of the arrows.

Stationary laser engraving machine 4 contains a PC (personal computer) with interface IF as a control device and signal generator. Control device 6 delivers to first $CO_2$ laser 8 control signal 1 which causes first laser 8 to apply output laser radiation to acoustooptic modulator 12, this output laser radiation of first laser 8 being linearly polarized and having an unvarying amplitude.

Via interface IF of control device 6 control signal S3 is applied to acoustooptic modulator 12, causing modulator 12 to modulate the laser beam from first laser 8 in accordance with the signal fluctuations of control signal S3 such that the output laser beam from acoustooptic modulator 12 has fluctuations of intensity corresponding to control signal S3.

The structure and use of acoustooptic modulator 12 are known in principle. It characteristically involves a crystal and a piezoelectric element so that when the piezoelectric element is driven acoustic waves are sent through the crystal which influence its optical properties. The laser beam passing through the modulator is diffracted in accordance with the frequency of the acoustic wave, i.e. the power or intensity of the output beam from modulator 12 is modulated, whereby working beam 1 emerging from the modulator is the beam of the first order of diffraction of the modulator.

The output laser beam from acoustooptic modulator 12 passes via optical system 18, where the radiation is focused, onto workpiece surface 22.

The power of the laser beam impinging on workpiece surface 22 thus varies in accordance with control signal S3, and since this laser beam scans workpiece surface 22 at constant speed, a profile corresponding to control signal S3 arises in workpiece surface 22. High beam power results in great machining depth, low beam power in small machining depth.

A laser engraving machine of the abovementioned kind, as is known from DE 42 12 390 A1, is constructed such that the two laser beams from the laser beam sources are directed before the workpiece via separate optical paths onto the workpiece surface so as to produce there a beam spot condensed by exact overlap of several beams, or else a multipart beam spot in which several partial beams are combined in a certain pattern in partial overlap or no overlap at all. U.S. Pat. No. 4,947,023 discloses a laser engraving machine wherein two laser beams are guided coaxially before the optical system in a partial area of their particular optical paths. This is intended to obtain a double engraving depth in the workpiece if both lasers are switched on during the work cycle.

DE 37 14 504 A1 discloses a laser engraving machine using two lasers with different wavelengths. The two laser beams of different wavelength are brought together on one machining spot.

It is known to modulate directly the operation of first laser 8 with the aid of control device 6 to obtain the desired machining profile on workpiece surface 22. However, a typical $CO_2$ laser has a maximum modulation frequency in the kilohertz range, which prohibits fast machining of workpiece surfaces at least when the desired profile has very fine structures.

The use of the acoustooptic modulator permits faster and finer machining of the workpiece surface, because typical acoustooptic modulators have a maximum modulation frequency in the megahertz range.

However, the use of acoustooptic modulators is restricted because such a modulator can usually only modulate a laser beam with a maximum power of 100 watts. In many cases of application, for example when graduating press cylinders, it is imperative to obtain a certain profile depth. At a given upper power limit due to the modulator and at a given minimum profile depth at the bottom of the profile formed in workpiece surface 22 the machining speed is consequently restricted, since a certain minimum energy must be applied to the workpiece surface via the laser beam to attain the required profile depth in the workpiece surface. It follows that the laser beam having maximum power can only be moved across the workpiece surface relatively slowly.

The invention is based on the problem of providing a laser engraving machine of the abovementioned kind which can form fine contours, on the one hand, and obtain a certain minimum profile depth, on the other hand, while machining the workpiece surface fast.

SUMMARY OF THE INVENTION

This problem is solved according to the invention in a laser engraving machine of the stated kind in that the output laser radiation from the second laser beam source is brought together with the output laser radiation from the modulator on a common beam axis before the optical system, and the first and second control signals are shaped such that the first control signal defines the fine structures of the desired profile while the second control signal supplied to the second laser beam source corresponds to the deep places in the profile.

The control signals used for driving the laser beam sources do not have a rectangular form but sloping signal edges, i.e. they change their level between the maximum and minimal values gradually. Only to form the edges of fine structures is there a fast change in the signal level of the first control signal for the modulator, so that the output laser radiation from the modulator likewise changes abruptly. Thus modulated laser beams form fine contours in the workpiece surface. When the laser beam is then guided further across the workpiece surface, the power of the laser beam increases so that the profile produced in the workpiece surface becomes accordingly deeper. While the first part of an engraved area is formed solely by the laser beam emitted by the modulator, the laser beam from the second laser beam source is then added. This additional laser beam makes the total power of the laser beam impinging on the workpiece surface greater, preferably many times greater, than the power which delivered only by the output laser beam from the modulator.

While the fine contours are produced by the relatively high modulation frequency of the acoustooptic modulator, the deep areas of the desired profile are formed by connecting the second laser beam source. Since the deep areas must only be produced in those portions of the profile which are relatively long (viewed along the scanning line on the workpiece surface), the maximum modulation frequency in the kilohertz range suffices for the second laser light source.

The inventive measure thus utilizes the high maximum modulation frequency of an acoustooptic modulator, on the one hand, and compensates its restriction by the maximum laser power by connecting the second laser beam source when deep areas of the profile must be produced, on the other hand.

The invention can fundamentally be realized with two separate lasers, for example $CO_2$ lasers. In a practical embodiment, a laser with two laser tubes is used, one laser tube delivering a laser beam with constant amplitude while the laser beam of the other laser tube is guided through the acoustooptic modulator.

One obtains an embodiment which is especially favorable in practice when the laser beams delivered by the first and second laser beam sources are linearly polarized perpendicular to each other. The first linearly polarized laser beam is applied to the acoustooptic modulator and modulated thereby with high modulation frequency. The output laser beam from the modulator is applied to a selective mirror disposed in the beam path at an angle of 45°. The polarization vector of this laser beam from the modulator has an angle of about 45° to the mirror surface on which the laser beam impinges. The laser beam is transmitted by the mirror. The other laser beam having a polarization vector perpendicular to the former polarization vector hits the mirror from the other side, its polarization vector extending parallel to the mirror surface in question. This causes the laser beam from the second laser beam source to be reflected by the mirror. The transmitted and reflected, each linearly polarized, laser beams are combined into a common laser beam which passes onto the optical system and is focused thereby onto the workpiece surface.

In the way known in the art, the control device of such a laser engraving machine consists mainly of a PC (personal computer) and corresponding interface IF. Data of the desired profile for the workpiece surface to be engraved are stored in a memory. These data are processed by the PC into a control signal, that is, a signal varying in time between two levels whereby the signal level corresponds fundamentally to the desired profile along the scanning line on the workpiece surface. This control signal is divided according to the invention into the first control signal supplied to the acoustooptic modulator, and the second control signal supplied to the second laser beam source. Since the laser power emitted by the modulator, like the laser power emitted by the second laser beam source, is essentially proportional to the amplitude characteristic of the control signal in question, the sum of the first and second control signals yields the control signal initially provided by the PC. In other words, the first and second control signals result from suitable subtractive separation of the control signal produced by the PC.

The modulator can preferably be an acoustooptic modulator following the laser. However, a similar mode of operation is also achieved if another modulator is used. One can also obtain the desired modulation of the laser light for machining the workpiece surface with the aid of a Q-switch in the laser resonator.

The first laser beam source and second laser beam source need not necessarily produce laser light with the same wavelength. One can also use different wavelengths for the first and second lasers. In this case, a wavelength-selective mirror is then disposed before the optical system of the laser engraving machine.

BRIEF DESCRIPTION OF THE DRAWINGS

In the following some embodiments of the invention will be explained more closely with reference to the drawing, in which.

DETAILED DESCRIPTION OF THE PREFERRED EMBODIMENTS

Figure 1:
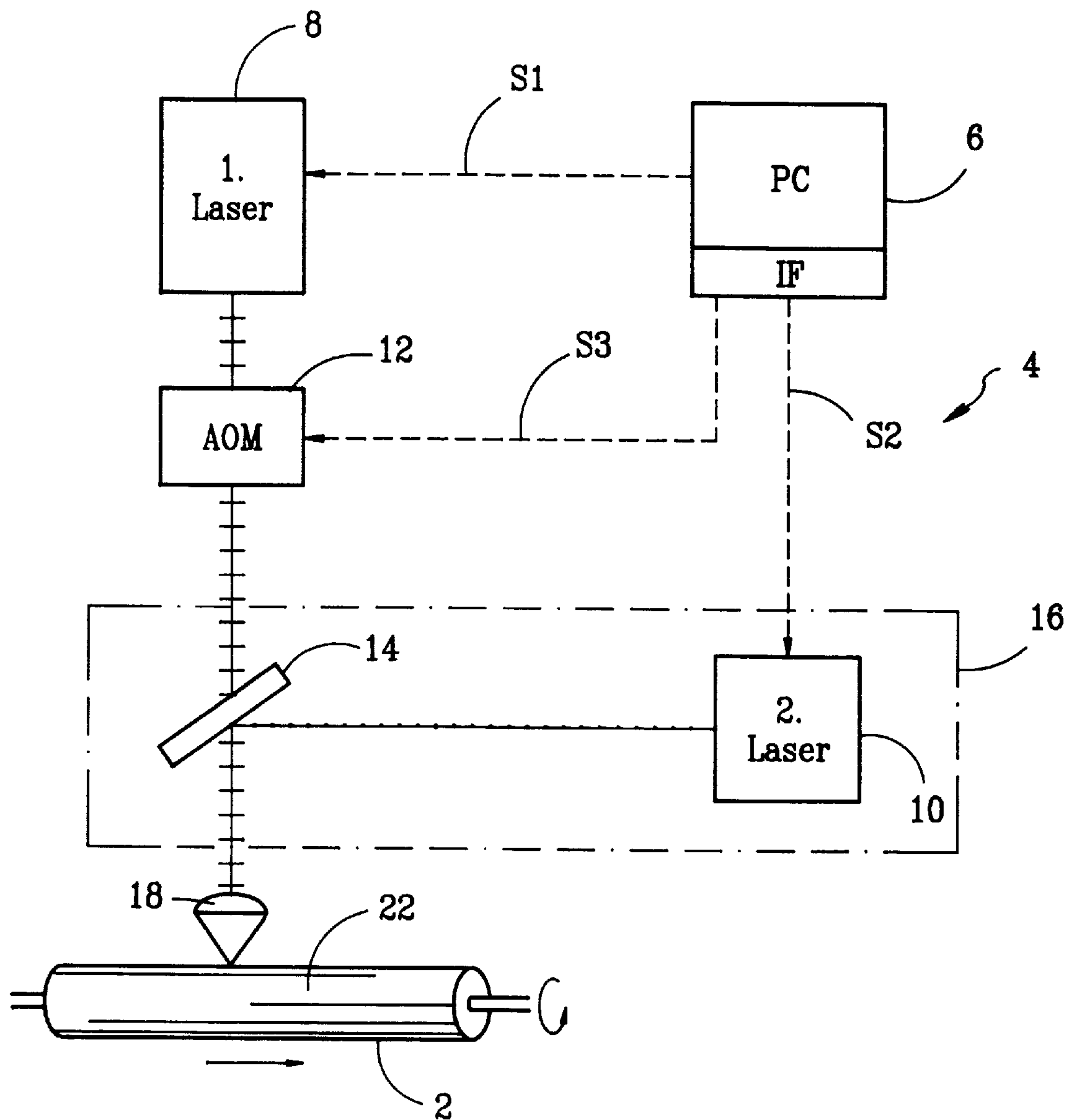
FIG. 1 shows a schematic sketch of a laser engraving machine.

Inventive laser engraving machine 4 shown in FIG. 1 contains the above-explained components of a known laser engraving machine, namely control device 6 consisting of a PC and interface IF, first laser 8, acoustooptic modulator 12 and optical system 18 which focuses the output laser beam from acoustooptic modulator (AOM) 12 onto workpiece surface 22 of workpiece 2, which is a rubber cylinder to be engraved.

FIG. 1 shows by a dash-dot line an additional part to be referred to here as depth engraving additional part 16. The depth engraving additional part contains selective mirror 14 and second laser 10.

Control device 6 delivers control signal S1 to first laser 8 so that the latter applies a laser beam with linear polarization and constant power to accustooptic modulator 12. The latter receives from control device 6 control signal S3 defining the fine contours of the desired profile of workpiece surface 22. The likewise linearly polarized output laser beam from acoustooptic modulator 12 is transmitted by selective mirror 14 and passes via optical system 18 onto workpiece surface 22.

Second laser 10 receives control signal S2 from PC 6 and delivers a laser output beam which is linearly polarized but the polarization vector of the laser beam emitted by second laser 10 is perpendicular to the polarization vector of the laser beam delivered by modulator 12. Due to the polarization vectors indicated by short lines and dots in FIG. 1, selective mirror 14 transmits the laser beam emitted by modulator 12 and reflects the laser beam delivered by second laser 10, so that the two laser beams having perpendicular polarization vectors are united in a common beam path and reach workpiece surface 22 via optical system 18.

While control signal S1 and therefore also the output laser beam from first laser 8 have a constant amplitude or power, first control signal S3 and second control signal S2 have a time behavior corresponding to the desired profile along the scanning line of the laser beam on workpiece surface 22. The power of the laser beams emitted by modulator 12 and second laser 10 is virtually proportional to the amplitude of control signals S3 and S2, respectively.

Figure 2:
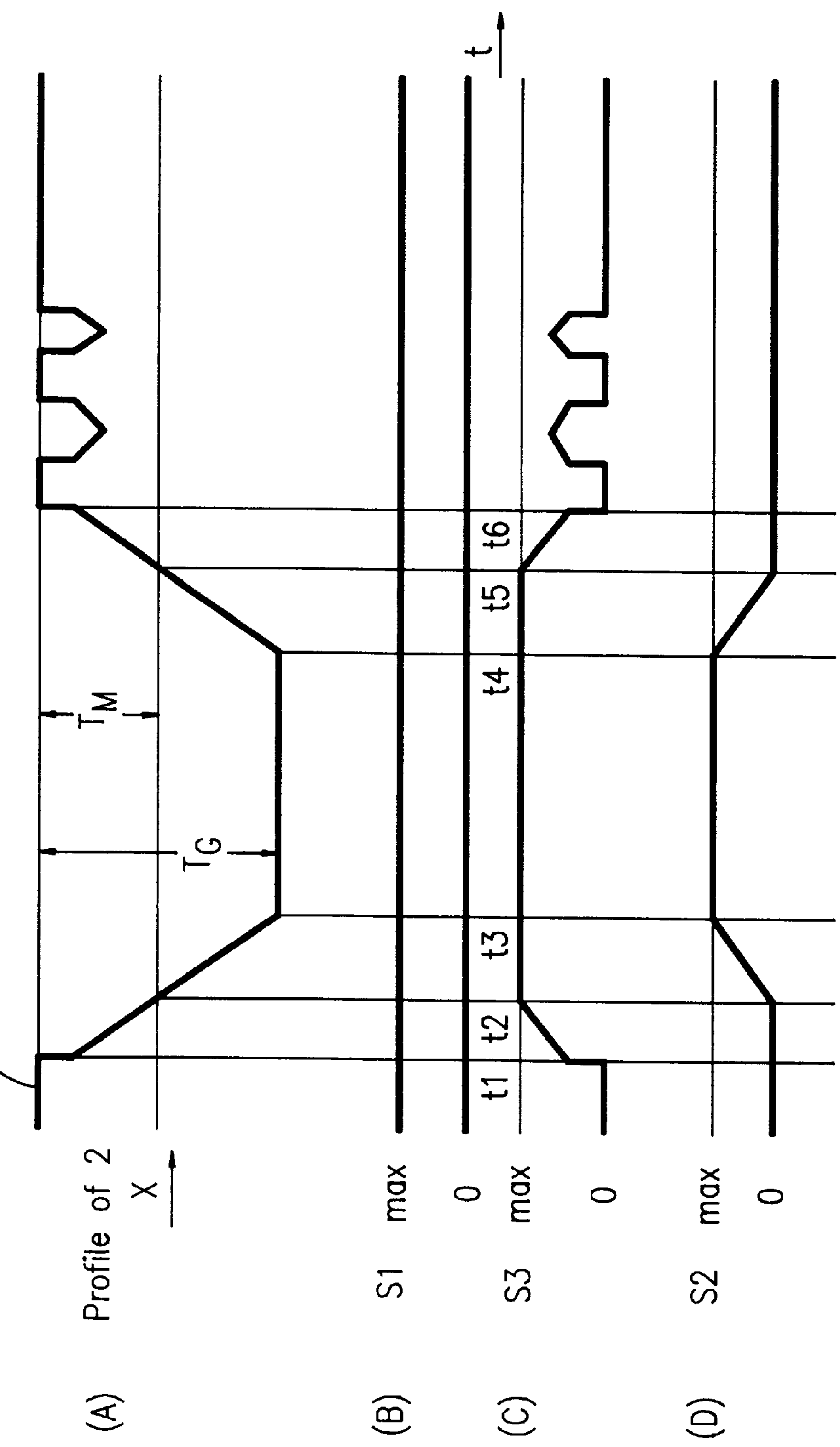
FIG. 2 shows pulse diagrams of several control signal patterns in conjunction with a corresponding profile of a workpiece surface.

FIG. 2 shows at A) the profile of workpiece 2 in its workpiece surface 22. The course of the profile along the scanning line of the laser beam on the workpiece surface is of course related to the scanning speed at which the laser beam moves across the workpiece surface. The local change of the profile in workpiece surface 22 thus corresponds to the time rate of change of (first) control signal S3 supplied to acoustooptic modulator 12, and of (second) control signal S2 supplied to second laser 10 by control device 6. Control signals S1, S3 and S2 are shown in FIG. 2 at B), C) and D).

Due to the abovementioned relation between the course of the profile along the scanning line of the laser beam on workpiece surface 22 and the time behavior of the control signals, in particular control signals S3 and S2, individual places in the profile shown in FIG. 2A) can be related to times $t_1$ to $t_6$ during the course of the control signals.

Control signal S1 supplied to first laser 8 has constant (maximum) amplitude so that laser 8 delivers a laser beam with constant power to acoustooptic modulator 12.

In the following the course of first control signal S3 (FIG. 2C) supplied to acoustooptic modulator 12 will be considered. At time $t_1$ the level of control signal S3 jumps to a certain value, and the resulting abrupt increase in power of the laser beam emitted by modulator 12 causes a steep step to form in workpiece surface 22. Between times $t_1$ and $t_2$ the level of control signal S3 increases gradually to a maximum value, and the depth of the profile accordingly increases gradually with respect to workpiece surface 22. At time $t_2$ when the maximum level of control signal S3 and therefore the maximum power of the laser beam delivered by acoustooptic modulator 12 is reached, the level of control signal S2 begins to rise. In accordance with the sum of the levels of control signals S2 and S3 the power of the laser beams united by selective mirror 14 increases on the workpiece surface so that the profile depth is increased. At time $t_3$ the level of control signal S2 reaches its maximum value. This corresponds to maximum profile depth $T_G$. Total profile depth $T_G$ results from the sum of the maximum amplitudes of the two control signals S2 and S3.

At time $t_4$ the level of control signal S2 begins to sink, and the depth of the profile in the workpiece surface accordingly decreases. Between $t_2$ and $t_5$ control signal S3 remains at its maximum level, beginning to decrease after time $t_5$ when control signal S2 has resumed zero level, until the level of control signal S3 drops to zero at time $t_6$. After time $t_6$ no laser beam passes onto the workpiece surface so that no engraving takes place.

Comparison of control signals S3 and S2 indicates that second control signal S2 supplied to second laser 10 is "turned on" only when the profile is deeper than certain profile depth X in FIG. 2A). Consequently the "modulation frequency" required for second laser 10 is lower than the modulation frequency of acoustooptic modulator 12. The laser beam delivered by latter modulator 12 thus ensures the formation of fine contours. This output laser beam from acoustooptic modulator 12 could obtain a maximum machining depth of $T_M$ (see FIG. 2A). At greater depths second laser 10 is connected.

Figure 3:
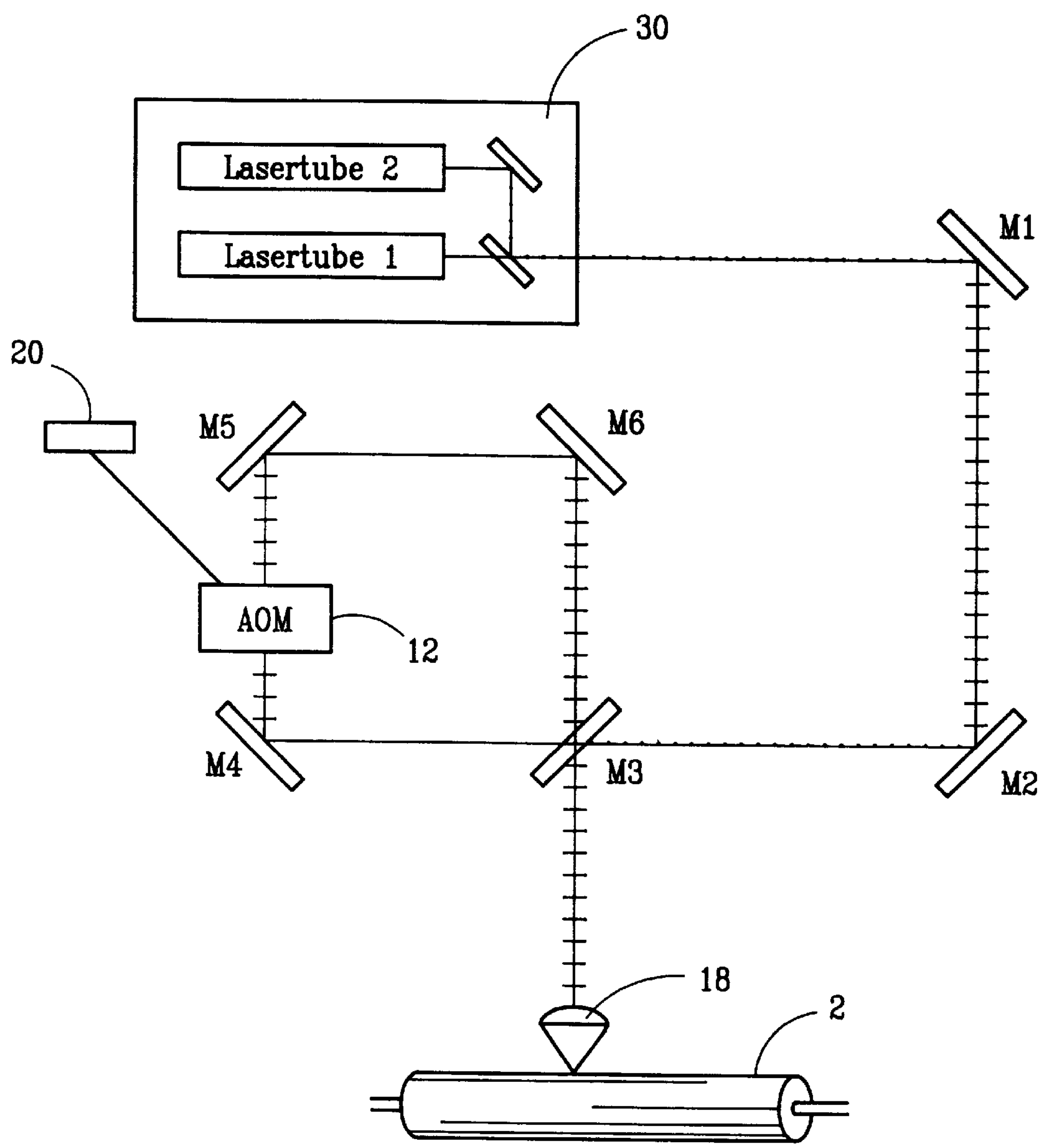
FIG. 3 shows a schematic representation of a further embodiment of a laser engraving machine according to the invention.

FIG. 3 shows a further, special embodiment of a laser engraving machine. While the embodiment of FIG. 1 fundamentally uses two separate lasers, for example two separate $CO_2$ lasers, the embodiment of FIG. 3 uses laser 30 with two laser tubes each emitting linearly polarized laser radiation, the two polarization vectors being perpendicular to each other. At the output of laser 30 the laser light emerges with two perpendicular components. By repeated deflection on tilted mirrors M1, M2 this light passes onto selective mirror M3 corresponding to mirror 14 shown in FIG. 1. The radiation with the linear polarization, which is indicated by dots in FIG. 3, is reflected by mirror M3 onto optical system 18. The radiation polarized perpendicular thereto reaches acoustooptic modulator 12 via further tilted mirror M4. The laser radiation emerging there passes via further tilted mirrors M5, M6 through mirror M3 onto optical system 18. On mirror M5 there is a fade-out of the zero order diffraction maxima. This radiation fraction is absorbed by absorber 20. The first order diffraction maximum reaches the surface of workpiece 2 via the following mirrors and optical system 18.

The above described embodiments can be modified within the scope of protection of the invention.

Figure 4:
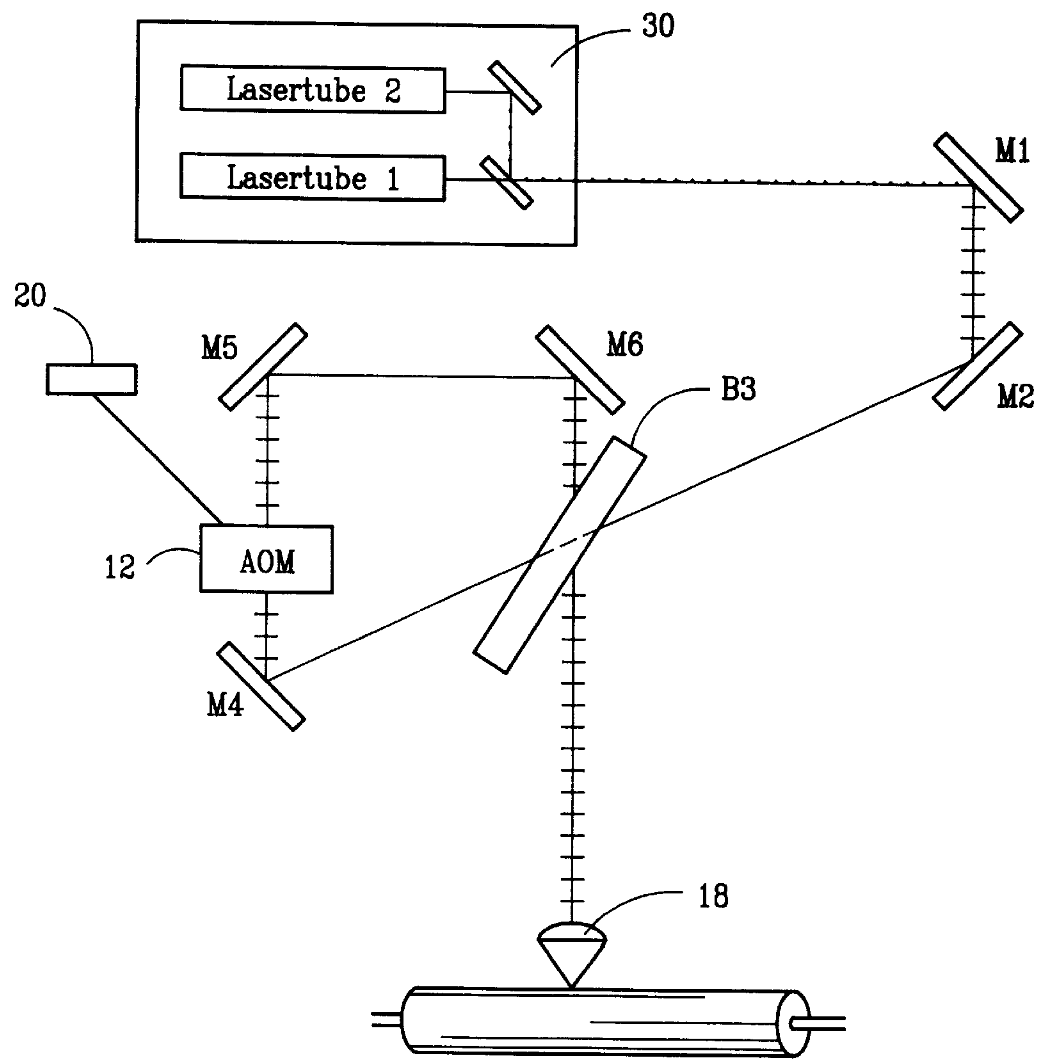
FIG. 4 shows a schematic representation of an embodiment modified over FIG. 3.

Instead of mirror M3 shown in FIG. 3 one can also use a Brewster window with a somewhat different geometry of the beam control, as shown in FIG. 4 at B3.

Furthermore, one can also superimpose two laser beams with different wavelengths by means of a wavelength-selective mirror. This embodiment is not shown in the drawing. However, it is clear that the two laser beam sources can emit laser beams with different wavelengths in this embodiment.

In the embodiment of FIG. 1 acoustooptic modulator 12 follows first laser 8. However, modulation of the laser light can also be obtained by a laser with a Q-switch. As known, this Q-switch is located in the resonator of the laser.

What is claimed is:

1. A laser engraving machine (4) for engraving a workpiece surface (22) of a workpiece, having a first laser beam source (8), a modulator (12) in a beam path of the first laser beam source (8), a following optical system (18) spaced from the workpiece surface (22), the optical system (18) and the workpiece being moved relative to each other, a control device (6) which drives the modulator (12) with a first control signal (S3) so that its output laser radiation impinging on the workpiece surface (22) is modulated according to the first control signal (S3) and machines the workpiece surface (22) to depths according to the first control signal (S3), and a second laser beam source (10) which is directly driven by the control device (6) with a second control signal (S2), characterized in that the output laser radiation from the second laser beam source (10) is brought together with the output laser radiation from the modulator (12) on a common beam axis before the optical system (18), and the first and second control signals (S3, S2) are shaped such that the first control signal (33) defines fine structures of a desired profile while the second control signal (S2) supplied directly to the second laser beam source (10) corresponds to deep places in the profile.

2. The laser engraving machine of claim 1, characterized in that the first and second laser beam sources (8, 10) each emit linearly polarized radiation with substantially perpendicular polarization vectors, and the output laser radiation from the modulator (12) and the output laser radiation from the second laser beam source (10) are applied to a selective mirror (14) or a Brewster window (B3) from different sides so that the transmitted and reflected radiation is applied commonly to the optical system.

3. The laser engraving machine of claim 1, characterized in that the first and second laser beam sources emit laser light with different wavelengths, and these two laser beams are applied to the optical system via a wavelength-selective mirror.

4. The laser engraving machine of any of claims 1, characterized in that the first control signal (S3) and the second control signal (S2) are gained subtractively from a single control signal which corresponds to the desired profile of the machined workpiece surface (22).

5. The laser engraving machine of any of claims 1, characterized in that the modulator is an acoustooptic modulator (12).

6. The laser engraving machine of any of claims 1, characterized in that the modulator is formed as a Q-switch of the first laser beam source (8).

* * * * *